(No Model.)

W. BRITAIN.
MEANS FOR OPERATING MECHANICAL TOYS.

No. 427,734. Patented May 13, 1890.

WITNESSES:
W. Kirkup
Frank A. Keller

INVENTOR
William Britain
BY
James N. Lancaster
ATTORNEY

UNITED STATES PATENT OFFICE.

WILLIAM BRITAIN, OF LONDON, COUNTY OF MIDDLESEX, ENGLAND.

MEANS FOR OPERATING MECHANICAL TOYS.

SPECIFICATION forming part of Letters Patent No. 427,734, dated May 13, 1890.

Application filed October 25, 1889. Serial No. 328,211. (No model.) Patented in England November 27, 1888, No. 17,258.

*To all whom it may concern:*

Be it known that I, WILLIAM BRITAIN, a subject of the Queen of Great Britain, and a resident of London, in the county of Middlesex, England, have invented certain new and useful Improvements in Means for Operating Mechanical Toys, (for which I have obtained a patent in Great Britain, No. 17,258, dated November 27, 1888,) of which the following is a full, clear, and exact specification.

The object of my invention is to make a simple motive power that shall be applicable to various kinds of mechanical toys.

My invention consists of a new mechanical movement adapted to operate various kinds of mechanical toys, all of which will be fully described, and pointed out in the claims hereinafter.

Figure 1:
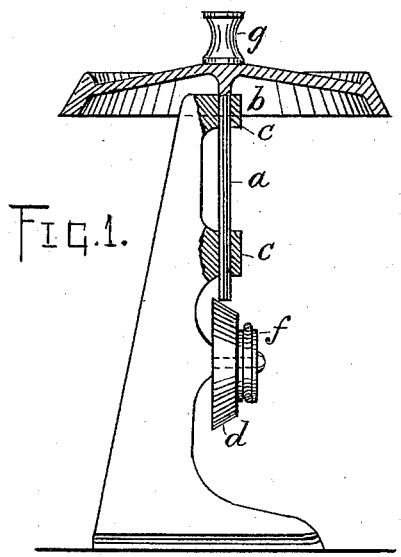
Figure 2:
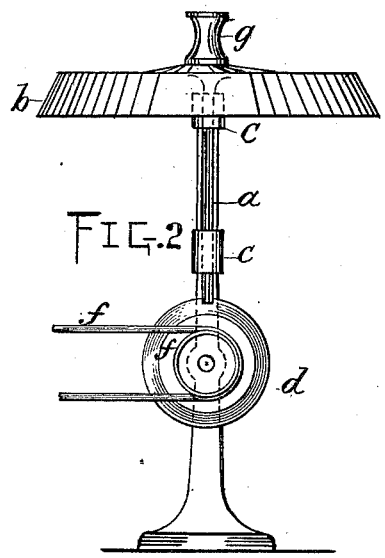
Figure 3:
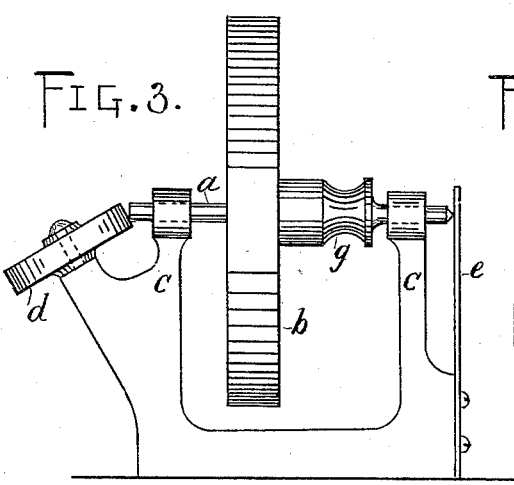
Figure 4:
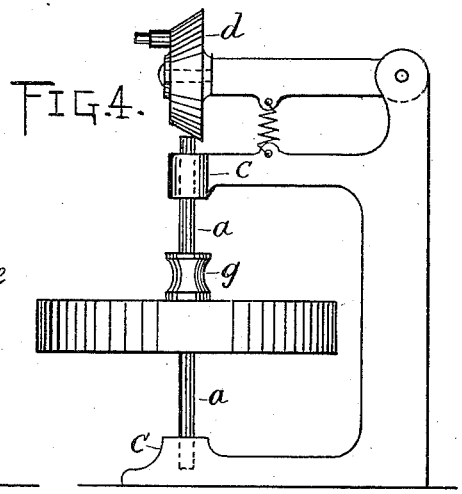

In the accompanying drawings, Figure 1 is a vertical section, and Fig. 2 a side elevation, illustrating my improvements. Figs. 3 and 4 are side elevation and plan view, respectively, of two modifications.

The letters refer to the same parts in all the drawings.

In carrying out my invention I make a spindle $a$ with a fly-wheel $b$, fixed upon it and working in suitable bearings $c\ c$. I make one end of this spindle flat and to pass right through its bearings and to press upon the rim of a wheel $d$, placed in such a position that only one side of the end of the spindle shall press upon it. I obtain the necessary pressure when the spindle is vertical, as in Figs. 1 and 2, by placing the wheel which it is to drive at its lower end and making the weight of the fly-wheel and spindle to rest upon it, or by making the weight of the wheel to rest upon the upper end of the spindle, as in Fig. 4, and when the spindle is horizontal by means of a spring $e$ at the end of the spindle opposite to that which is to press upon the wheel, as in Fig. 3. I connect the wheel by any suitable means to whatever I intend it to move, and then make the fly-wheel revolve by any suitable means, such as a string and pulley. (Not shown.) The end of the spindle, pressing upon the rim of the wheel, causes it to revolve and to move whatever it is connected with.

Having thus described my invention, what I claim as new, and desire to secure by Letters Patent, is—

1. The combination consisting of the spindle, the fly-wheel and pulley connected therewith, and the wheel in frictional contact with the end of the spindle, with its acting-face at an angle to the axis of the spindle, all mounted upon suitable bearings and adapted to operate mechanical toys, substantially as specified.

2. The combination of the spindle $a$, bearings $c$ therefor, pulley $g$, and fly-wheel $b$ on said spindle, the wheel $d$, and the spring $e$, bearing on the end of said spindle, substantially as shown and described.

In testimony that I claim the foregoing I have hereunto set my hand this 2d day of April, 1889.

WILLIAM BRITAIN.

Witnesses:
 S. C. TANSAZ,
 W. CALLON,
*Both Clerks to Messrs. John Newton & Sons,*
 *9 Birchin Lane, London, Public Notaries.*